April 23, 1935.  G. F. LINDE  1,998,679
LIQUID STERILIZER
Filed June 4, 1934  2 Sheets-Sheet 1
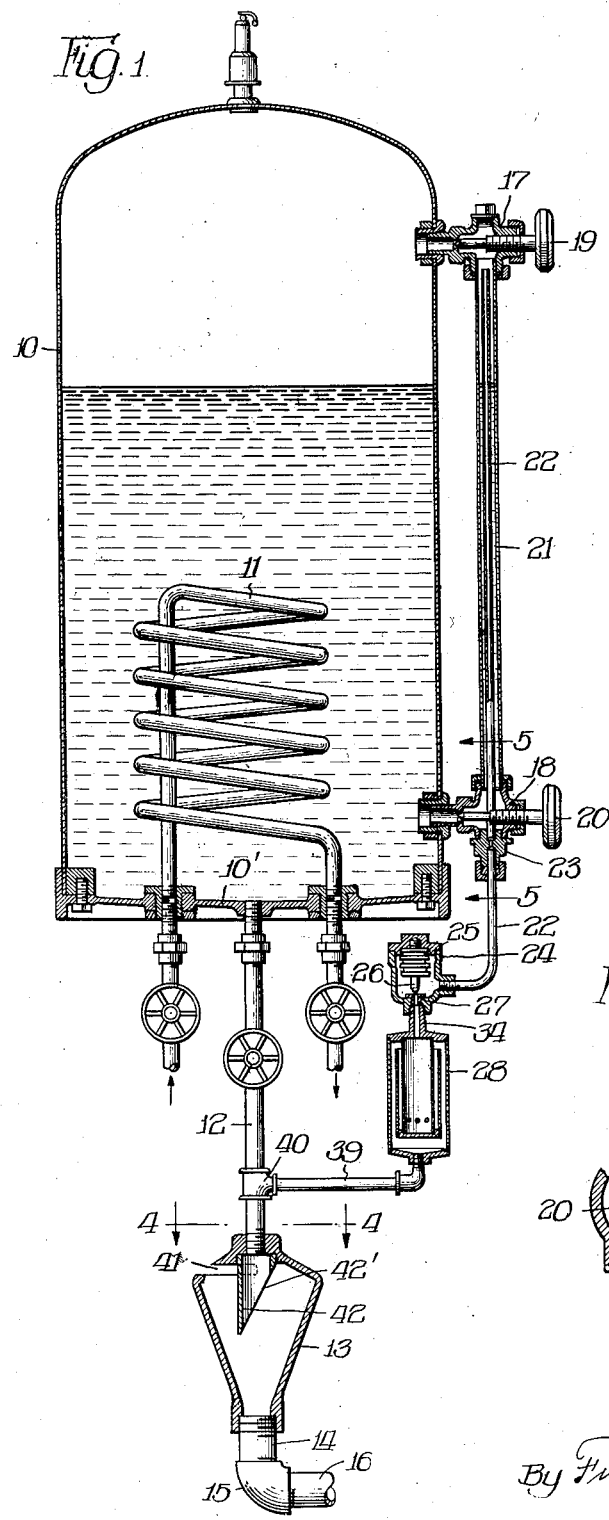
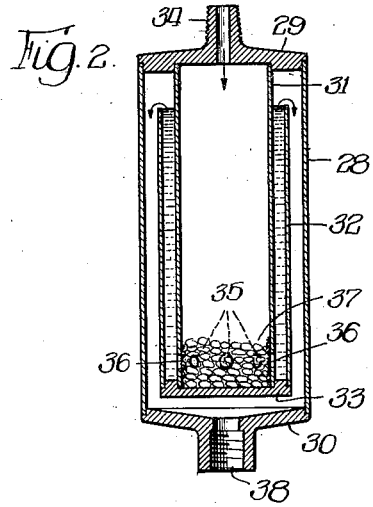
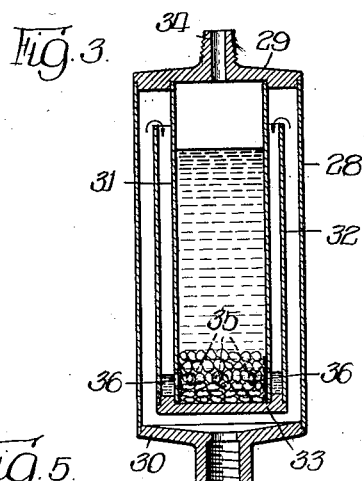
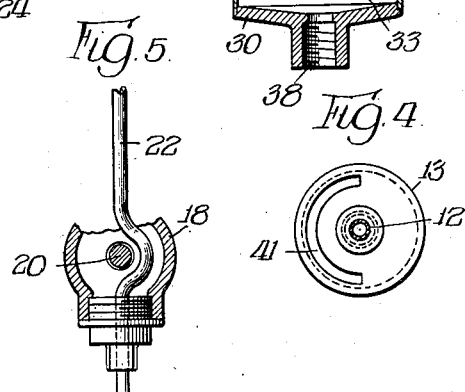
Inventor:
Gustave F Linde,
By Fisher, Clapp, Soans + Pond,
attys.

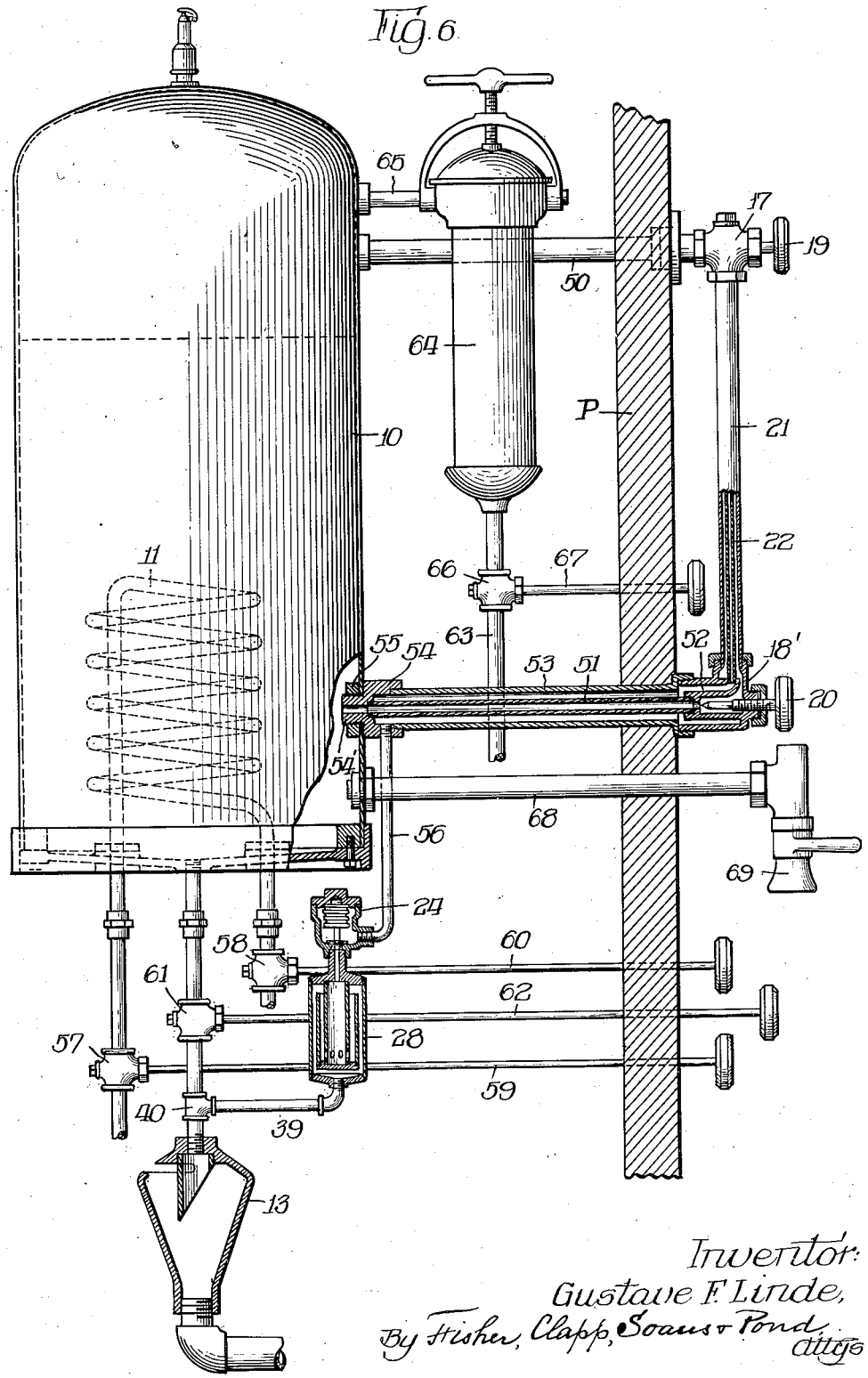

Patented Apr. 23, 1935

1,998,679

UNITED STATES PATENT OFFICE 1,998,679

LIQUID STERILIZER

Gustave F. Linde, Madison, Wis., assignor to Scanlan-Morris Company, Madison, Wis., a corporation of Wisconsin Application June 4, 1934, Serial No. 728,847

8 Claims. (Cl. 257—64)

This invention relates to the art of liquid sterilizing apparatus. Apparatus of this character, extensively used in hospitals and bacteriological laboratories, commonly comprises a tank to receive the liquid to be sterilized by heat, means for heating the liquid to a sterilizing temperature, and a glass gauge mounted on one side of the tank to indicate to the operator the level of the liquid in the tank. The gauge glass, being a relatively long narrow tube entirely surrounded by the air in the room, cools rapidly and consequently neither the glass itself nor the body of liquid therein reaches a sterilizing temperature during the treatment of the main body of liquid in the tank, so that the liquid in the gauge, being always in communication with the liquid in the tank, more or less contaminates the sterilized water in the tank. One object of the present invention is to provide in association with the tank and gauge an efficient means for thoroughly sterilizing the gauge and the water therein so that the tank and the main body of water therein will not become contaminated from the water in the gauge.

Again, in order to draw off the sterilized liquid from the tank it is necessary, of course, to vent the tank to air which fills the tank as the liquid is drawn off, and unless the incoming air is perfectly pure and clean, bacteria may be introduced into the tank with the air. Of course, pure air carries no bacteria, but most air is more or less dust laden, and the bacteria are found in the dust. Another object of the invention is, therefore, to provide an attachment for sterilizers of this type by which the incoming air can be thoroughly washed and freed of all bacteria.

One means by which the above stated objects may be attained in accordance with the principle of the present invention is illustrated in the accompanying drawings, in which:

Fig. 1 is a vertical sectional view of the complete apparatus, with certain of the pipes appearing in elevation.

Fig. 2 is an enlarged sectional detail of the air washer and sterilizer, showing its condition when steam from the sterilizing tank is discharging therethrough.

Fig. 3 is a similar view of the air washer and sterilizer showing its condition when steam is being condensed in the sterilizing tank, or the sterilized water is being drawn therefrom, or both, and air is being admitted through the washer and sterilizer to the sterilizing tank under the vacuum pull in the latter.

Fig. 4 is a plan section of a sanitary air gap fitting at the lower end of the system through which the incoming air is admitted to the air washer and sterilizer.

Fig. 5 is a sectional detail on the line 5—5 of Fig. 1.

Fig. 6 is a view similar to Fig. 1 illustrating a recessed-in-wall installation.

Referring to the drawings, 10 designates a tank adapted to contain a body of water or other liquid to be sterilized, the liquid being heated by any suitable means such, for instance, as a steam coil 11. From the center of the concave bottom wall 10' of the tank 10 a valve-controlled drain pipe 12 leads into a waste fitting 13, the lower end of which communicates by a short pipe section 14 and elbow 15 with a drain pipe 16 leading to the sewer. The purpose of the last described parts, is, of course, to drain off, from time to time, any sediment that may accumulate in the bottom of the tank 10.

In one side of the tank 10 are mounted upper and lower standard gauge glass fittings 17 and 18 equipped with manually operated valves 19 and 20, respectively, which are normally open and closed only in an emergency such as the breaking of the gauge glass, and between these fittings is mounted the gauge glass 21. Within the gauge glass 21 and coaxial therewith is the upper section of a steam pipe 22, the lower end of which upper section may be mounted in the axially bored lower plug 23 of the fitting 18, the lower portion of the upper section of pipe 22 being bent laterally to clear the needle valve 20, as shown in Fig. 5.

The upper end of the upper section of steam pipe 22 communicates freely with the chamber of the upper gauge fitting 17 so that it is in free communication with the interior of the upper portion of the tank 10. The upper end of the lower section of pipe 22 is mounted in the plug 23 and its lower end connects into a thermostatic steam trap 24 of the well known type wherein a bellows diaphragm 25, that is expansible by the heat of the steam, carries a valve 26 cooperating with a valve seat 27 in the bottom of the trap so that, shortly after the steam enters the trap the valve 26 is closed on its seat by the diaphragm 25 so as to prevent further escape of steam.

Connected into the lower end of the steam trap 24 is an air washer and sterilizer, the structural details of which are best illustrated in Figs. 2 and 3, and comprise an outer steam and air tight casing 28 closed at its upper and lower ends by heads 29 and 30, an inner tube 31 secured at its open upper end in the head 29, and an outer tube 32 encircling the inner tube 31, open at its upper end, and at its lower end closed by a cap 33 in which the lower end of the inner tube 31 is seated and sealed. The upper head 29 of the washer and sterilizer is equipped with a threaded nipple 34 that screws into the lower end of the steam trap 24, and in the lower portion of the inner tube 31 is a ring of holes 35 that may be covered with screens 36 where, as is preferable, the inner tube 31 is supplied with a body of glass or porcelain beads 37, which are used to break up bubbles in the air that is passing through the body of water in the tube 31.

The lower head 30 of the air washer and sterilizer is formed with a tapped nipple 38 to receive a pipe 39 that communicates with the drain pipe 12 through a T-fitting 40 in the latter.

The sanitary air gap drain fitting 13, which is preferably employed, is a hollow inverted pear-shaped structure tapped to receive the threaded lower end of the drain pipe 12, and formed in one side thereof with a substantially semi-circular air inlet opening 41, which straddles an internal baffle 42 mounted in the upper end of the fitting, the baffle 42 having a biased open side 42' remote from the air gap or inlet 41, so that sediment deposited from the pipe 12 cannot splash on and thus foul or obstruct the air gap or mouth 41.

Briefly describing a cycle of operation, the tank 10 is filled in the conventional manner and steam turned on to sterilize the water. The air above the water is expanded by the heat and escapes through tube 22 in the gauge glass, through the thermostatic trap 24 and through the washer and sterilizer 28 to the sanitary air gap fitting 13 which is open to the air through the opening 41. This air in its escape depresses the liquid level in the inner tube 31 down to the holes 35, causing a partial overflow of the water in the washer and sterilizer, as shown in Fig. 2. During the sterilizing period the thermostatic trap is intermittently draining condensate into the inner tube 31, thereby replenishing the condensate blown off by the air. The reason for this intermittent action of the steam trap during the sterilizing period is found in the fact that, after the trap valve has closed by reason of the heat imparted to the motor diaphragm, a leg of steam is trapped in the pipe 22 above the trap. As this leg of steam cools by radiating its heat, condensate is formed, and this condensate is drained to steam trap 24 by pipe 22, which cools motor diaphragm causing it to contract thereby raising the trap valve 26 from seat 27 only sufficiently to allow condensate to drain from trap into the air washer and sterilizer. The steam in pipe 22 which follows the condensate again expands the motor diaphragm and seats trap valve 26 against the seat 27, until this leg of steam has cooled sufficiently to form condensate, at which time the motor diaphragm will again contract and raise trap valve 26 from seat 27 only sufficiently to drain the condensate into the air washer and sterilizer. Each time the trap valve 26 seats against the seat 27, steam condensate forms and collects in the chamber of the trap above the valve, and each time the valve rises from the seat, this condensate drains into the air washer and sterilizer. At the end of the sterilizing period, when the steam is turned off, and the water in the tank begins to cool, stopping the flow of steam through the pipe 22, the natural radiation of the thermostatic trap will cool the expanding element in the trap, causing the trap valve to rise from its seat approximately one-eighth to one-fourth of an inch, allowing air to flow into the sterilizer tank as the steam condenses or water is drawn therefrom. When air flows through the washer and sterilizer due to reduced pressure in the sterilizing tank, the atmospheric pressure will cause the liquid level to be lowered between the inner and outer tubes and to the level of the holes 35 in the inner tube. This, of course, raises the liquid level in the inner tube, as is shown in Fig. 3. After the level between the inner and outer tubes has been lowered to the holes 35, air enters through the holes and bubbles up through the liquid column washing and sterilizing the air. The liquid in the inner tube 31 forms an effective seal against unsterilized air entering the sterilizer tank, since the air can enter the tank only through the body of water in the tube 31. When steam is formed in the sterilizer, a considerable quantity thereof flows through the system before the diaphragm in the thermostatic trap expands sufficiently to close the trap; and this steam flowing through the washer and sterilizer sterilizes it effectively.

Fig. 6 illustrates an application of the invention to a sterilizer installation of the concealed type; that is, an installation wherein the sterilizer tank and its adjuncts, with the exception of the gauge and control valves, are recessed in a wall of an operating room, clinic chamber, or other compartment, so as to be substantially concealed. In such installation P designates a wall or panel, behind which the sterilizer tank 10 is located. The gauge glass fittings 17 and 18' are mounted on the outer side of the wall P and are connected to the tank 10 by upper and lower pipes 50 and 51. The lower gauge glass fitting 18' is slightly modified as shown to provide around the valve chamber an annular passage 52 that receives the lower end of the pipe 22 and communicates with a pipe 53 surrounding the pipe 51; the inner end of the pipes 53 and 51 being connected into a fitting 54 that is secured to the wall of the tank 10 by a threaded nipple 54' and nut 55. From the annular steam space between the pipes 51 and 53 a pipe 56 extends downwardly and connects into the steam trap 24, the pipes 53 and 56 being virtually an extension of the pipe 22.

In this form of installation the steam supply and exhaust valves 57 and 58 to and from the heater coil 11 are operated from the front of the wall P by long valve stems 59 and 60 respectively, and the drain valve 61 is operated by a similar long valve stem 62. In this view I have also indicated the water supply and draw off devices to the tank 10, the water supply pipe appearing at 63 connecting with the lower end of an ordinary water filter 64, the upper end of which communicates by pipe 65 with the interior of the tank 10. The water is turned on and off by a valve 66 likewise equipped with a stem 67 extending through the wall P. 68 designates the water draw-off pipe communicating with the lower portion of the tank 10 and extending through the wall P and equipped on its outer end with a valve-controlled faucet 69.

From the foregoing it will be seen that the invention accomplishes the two desirable results of, first, thoroughly sterilizing the gauge glass and liquid and preventing any contamination of the sterilized liquid from the latter; and, secondly, washing and sterilizing the air that is drawn into the tank as the sterilized liquid is withdrawn or the steam in the tank is condensed;

and in the performance of these results, the pipe 22 serves both as a steam pipe for heating the water in the gauge glass to a sterilizing temperature, and also as an air inlet pipe from the air washer and sterilizer.

I claim:

1. In an apparatus for sterilizing liquids, the combination with a tank, and a water level gauge communicating with the top and bottom portions of said tank, of an imperforate steam pipe extending through the water chamber of said gauge and communicating with the steam space of said tank.

2. In an apparatus for sterilizing liquids, the combination with a tank, upper and lower valve fittings on said tank, and a gauge glass mounted in and between said fittings, of a steam pipe having its upper end in communication with said upper valve fitting and extending through said gauge glass and lower fitting.

3. In an apparatus for sterilizing liquids, the combination with a tank, and a water level gauge communicating with the top and bottom portions of said tank, of a steam pipe extending through the water chamber of said gauge and communicating with the steam space of said tank, and a thermostatic steam trap on said steam pipe beyond said gauge.

4. In an apparatus for sterilizing liquids, the combination with a tank, upper and lower valve fittings on said tank, and a gauge glass mounted in and between said fittings, of a steam pipe having its upper end in communication with said upper valve fitting and extending through said gauge glass and lower fitting, and a thermostatic steam trap on said steam pipe beyond said lower fitting.

5. In an apparatus for sterilizing liquids, the combination with a tank, and a water level gauge communicating with the top and bottom portions of said tank, of an imperforate steam outlet and air inlet pipe extending through the water chamber of said gauge and communicating with the steam space of said tank.

6. In an apparatus for sterilizing liquids, the combination with a tank, and a water level gauge communicating with the top and bottom portions of said tank, of a steam outlet and air inlet pipe extending through the water chamber of said gauge and communicating with the steam space of said tank, and an air washer and sterilizer communicating with the steam discharge end of said pipe.

7. In an apparatus for sterilizing liquids, the combination with a tank, and a water level gauge communicating with the top and bottom portions of said tank, of a steam outlet and air inlet pipe extending through the water chamber of said guage and communicating with the steam space of said tank, a thermostatic steam trap on said pipe beyond said gauge, and an air washer and sterilizer communicating with the discharge end of said steam trap.

8. In an apparatus for sterilizing liquids, the combination with a tank, and a water level gauge communicating with the top and bottom portions of said tank, of a steam outlet and air inlet pipe extending through the water chamber of said gauge and communicating with the steam space of said tank, a thermostatic steam trap on said pipe beyond said gauge, an air washer and sterilizer communicating with the discharge end of said steam trap, and a drain fitting communicating with the discharge end of said washer and sterilizer, said fitting having an air inlet opening.

GUSTAVE F. LINDE.